US007739136B2

(12) United States Patent
Chang et al.

(10) Patent No.: US 7,739,136 B2
(45) Date of Patent: Jun. 15, 2010

(54) SYSTEMS AND METHODS FOR MONITORING AND CONTROLLING BUSINESS LEVEL SERVICE LEVEL AGREEMENTS

(75) Inventors: Hung-Yang Chang, Scarsdale, NY (US); Jun-Jang Jeng, Armonk, NY (US); Santhosh Kumaran, Croton-on-Hudson, NY (US); Haifei Li, White Plains, NY (US); Liang-Jie Zhang, Cortlandt Manor, NY (US)

(73) Assignee: International Business Machines Corporation, Armonk, CA (US)

( * ) Notice: Subject to any disclaimer, the term of this patent is extended or adjusted under 35 U.S.C. 154(b) by 22 days.

(21) Appl. No.: 11/956,784

(22) Filed: Dec. 14, 2007

(65) Prior Publication Data
US 2008/0097807 A1 Apr. 24, 2008

Related U.S. Application Data

(62) Division of application No. 10/617,965, filed on Jul. 11, 2003, now Pat. No. 7,313,533.

(51) Int. Cl.
*G06F 17/50* (2006.01)
(52) U.S. Cl. ........................................... 705/7
(58) Field of Classification Search ...................... 705/7
See application file for complete search history.

(56) References Cited

U.S. PATENT DOCUMENTS 7,412,403 B2 * 8/2008 Subbloie et al. ............... 705/11

FOREIGN PATENT DOCUMENTS

WO WO 9925085 A1 * 5/1999

OTHER PUBLICATIONS

Keller et al (Defining and Monitoring Service Level Agreements for Dynamic e-Business), Lisa 2002- 16th Sysem Administration Conference, pp. 189-204.*
Haifei Li, et al., "Managing Business Relationships in E-Services Using Business Commitments," Aug. 22-24, 2002.
Haifei Li, et al., "Commitment-Based Approach to Categorizing, Organizing and Executing Negotiation Processess," Proceedings of the IEEE International Conference on E-Commerce (CEC'03).
Haifei Li, et al., "An Approach of Modeling, Monitoring and Managing Business Operations for Just-In-Time Manufacturing," pp. 1-6.
Manjari Asawa, "Measuring and Analyzing Service Levels: A Scalable Passive Approach," Proceedings of the IEEE, 1998, pp. 3-12.

* cited by examiner

*Primary Examiner*—Romain Jeanty

(57) ABSTRACT

Systems and methods for monitoring and controlling business level SLAs (Service level Agreements), and more particularly, systems and method for monitoring and controlling business level SLAs using probe points, KPIs (Key Performance Indicators) and business commitments. An XML (extensible Markup Language)-based specification referred to as BPCL (Business Process Commitment Language) is used to describe business commitments. BPCL specifications are used by a business process management (BPM) system to configure, monitor, and control business processes based on business commitments. Business Commitments and BPCL provide a path toward model-based management for dynamic e-business solutions.

8 Claims, 8 Drawing Sheets

SYSTEMS AND METHODS FOR MONITORING AND CONTROLLING BUSINESS LEVEL SERVICE LEVEL AGREEMENTS

CROSS-REFERENCE TO RELATED APPLICATION

This is a Divisional application of U.S. application Ser. No. 10/617,965 filed on Jul. 11, 2003 now U.S. Pat. No. 7,313,533, the disclosure of which is herein incorporated by reference in its entirety.

TECHNICAL FIELD

The present invention relates to systems and methods for monitoring and controlling business level SLAs (Service level Agreements), and more particularly to systems and method for monitoring and controlling business level SLAs using probe points, KPIs (Key Performance Indicators) and business commitments. The present invention is further related to an XML (eXtensible Markup Language)-based specification referred to as BPCL (Business Process Commitment Language) that is used to describe business commitments. BPCL specifications are used by a business process management (BPM) system to configure, monitor, and control business processes based on business commitments. Business Commitments and BPCL provide a path toward model-based management for dynamic e-business solutions.

BACKGROUND

Due to innovations in network computing technologies and applications, many companies, businesses and organizations currently provide e-business services on global communication networks such as the WWW (World Wide Web) and the Internet. Such services are typically provided through an entity's Web site. Most organizations, however, do not have the necessary IT expertise to maintain their own Web sites or maintain such Web sites in a cost-effective manner. Furthermore, with the rapid advancement of dynamic e-business technology, organizations are no longer satisfied with isolated e-business applications and have the heavy burden of application integration. Corporate customers prefer to have an industry solution that is customized for their needs and ready to be used. As a result, many organizations outsource their IT services, including the management of secure Web sites, to an IT service provider such as IBM Global Services, which is expected to deliver domain-specific e-business solutions on time and at low cost.

Various systems and methods have been developed or proposed for providing SLM (Service Level Management). SLM refers to the disciplined and proactive methodology and procedures used to ensure that adequate levels of services are delivered to service requesters. The basis for SLM is service level agreement (SLA). A SLA is a contract between a service requestor and a service provider that specifies the minimal acceptable levels for a service. Such SLAs can include for example, requirements for quality of service (QoS) and security. SLM systems are important tools for managing the two-party relationship between a service provider and a service requestor.

The majority of the conventional contract management or service level management tools focus on external parties (e.g., trading partners) individually and, therefore, a global view is missing. For example, the proposed WSLA (Web Service Level Agreement) and tpaML (Trading Partner Agreement Markup Language) specifications of International Business Machines Corporation address the issue of managing external relationships. However, the focuses of such specifications are on one-to-one individual relationships, but do not provide solutions for managing a one-to-many relationship taking into consideration inter-dependencies among parties, for example.

Further, there are other standards or specifications that have been proposed to address different aspects of business process management. They are briefly described below.

BPSS (Business Process Specification Schema), from ebXML (electronic business XML initiative), provides a standard framework by which business systems may be configured to support execution of business collaborations consisting of business transactions. BPSS supports the specification of business transactions and the choreography of business transactions into business collaborations. Each business transaction can be implemented using one of many available standard patterns from ebXML. These patterns determine the actual exchange of business documents and business signals between the partners to achieve the required electronic commerce transaction.

BPML (Business Process Modeling Language) from Business Process Management Initiative is a meta-language for the modeling of business processes. BPML provides an abstract execution model for collaborative and transactional business processes based on the concept of a transactional finite-state machine. BPML considers e-business processes as made of common public interfaces and as many private implementations as process participants. This enables the public interface of BPML processes to be described as ebXML business processes or RosettaNet Partner Interface Processes, independently of their private implementations.

XPDL (XML-based Process Definition Language) from WfMC (Workflow Management Coalition) is an XML-based language for defining business processes. One of the key elements of the XPDL is its extensibility to handle information used by a variety of tools, as XPDL may not be capable of supporting all additional information requirements in all tools. One of the most important elements of XPDL is a generic construct that supports vendor specific attributes for use within the common representation.

BPEL4WS allows companies to describe business processes that include multiple Web services and to standardize message exchange internally and among partners. In BPEL4WS, business processes can be described in two ways. Executable business processes model actual behavior of a participant in a business interaction. In contrast, business protocols use process descriptions that specify the mutually visible message exchange behavior of each of the parties involved in the protocol, without revealing their internal behavior. The process descriptions for business protocols are called abstract processes. BPEL4WS provides a language for the formal specification of business processes and business interaction protocols. By doing so, it extends the Web Services interaction model and enables it to support business transactions. BPEL4WS defines an interoperable integration model that should facilitate the expansion of automated process integration in both the intra-corporate and the business-to-business spaces.

BOpS (Business Operational Specification) defines a notation for specifying the operational view of a business. This notation is called Business Operational Specification (BOpS) and is expressed as XML schema definitions. A layered view of business system modeling is utilized. In this view, a business system is composed of three layers: strategy, operation, and execution. BOpS addresses the modeling of the operational layer of a business system. By doing so, it bridges the gap between strategy and execution, enables the automated generation of execution models, and facilitates the tracking of execution against the strategy.

The aforementioned languages primarily address the definition and execution aspects of a business process. However, these specifications do not provide mechanisms for monitoring and controlling business-level SLAs and relationship among parties.

SUMMARY OF THE INVENTION

The present invention relates to systems and methods for providing e-business process management. Systems and methods according to the invention for providing e-business process management preferably employ mechanisms for monitoring and controlling business level SLAs using probe points, KPIs (Key Performance Indicators) and business commitments. A BPCL (Business Process Commitment Language) according to an embodiment of the invention is used to declaratively model relationships among external and internal parties and specify business commitments. BPCL can be used by a business process management (BPM) system to configure, monitor, and control business processes based on business commitments.

In one embodiment of the invention, a model for providing business process management is described using business commitment specifications that globally describe business relationships between multiple entities associated with a dynamic business process, including external and internal parties associated with the business process. The model is used for monitoring and controlling business-level SLAs (service level agreements) based on specified business commitments among the entities. The business commitments are defined using KPIs (Key Performance Indicators) which are defined using probe points, for example. The business commitments are preferably described using XML (extensible Markup Language) syntax.

In another embodiment of the invention, a system for providing business process management includes build-time components for generating documents that describe business relationships between a plurality of entities associated with a dynamic business process, and run-time components for processing specifications of the documents to provide business level SLA management of the dynamic business process. Preferably, the build-time components comprise a development tool for authoring BPCL documents that specify relationships between probe points, KPIs and business commitments, and wherein the run-time components comprise components for monitoring an controlling business level SLAs using specifications of a BPCL document. In one embodiment, the development tool comprises an Eclipse-based visual development tool that displays a hierarchical relationship among probe points, KPIs and business commitments of a BPCL document.

In yet another embodiment, the run-time components comprise a BPCL configurator module that allows dynamic changes to be made to a BPCL document and automatically propagates the changes to the run-time components. The run-time components comprise an actuator for sending generic notifications or invoking management directives that can alter the execution of the business process, a KPI calculator for determining KPI values, a condition evaluator for evaluating logical conditions of business commitments using KPI values, and an evaluation trigger that determines a trigger to invoke the condition evaluator. The trigger can be alarm-based or event-based, wherein instructions for an alarm-based trigger are provided by the BPCL configurator when reading a BPCL document.

In yet another embodiment of the invention, a mechanism is provided for automatically detecting a dependency between probe points, KPIs and business commitments, and for determining KPIs and business commitments that are affected by unavailable probe points.

In another embodiment of the invention, a method for managing a business process includes executing a business process that comprises an integrated set of applications that enable interactions between a plurality of entities, and managing the execution of the business process using business commitment specifications that describe one or more business commitments among said entities, wherein the business commitments are defined using KPIs and the KPIs are defined using probe points.

In yet another embodiment, managing the execution of a business process comprises monitoring a probe point associated with the business process, determining a value of a KPI when a probe point, which is associated with the KPI, is activated, and evaluating a business commitment associated with the KPI based on the determined value of the KPI to determine if the business commitment has been violated. The value of a KPI can be determined, for example, based on a value of at least one other KPI, invoking a function to determining the value of the KPI or based on a value extracted from a probe point. The process of evaluating a business commitment comprises evaluating a condition specified by the business commitment using a KPI value. An action can be commenced if it is determined that the business commitment has been violated based on the evaluation results. Commencing an action includes providing notification of the violation to an entity associated with the business commitment or invoking a management directive to alter the execution of the business process.

These and other embodiments, aspects, features and advantages of the present invention will be described or become apparent from the following detailed description of the preferred embodiments, which is to be read in connection with the accompanying drawings.

BRIEF DESCRIPTIONS OF THE DRAWINGS

DETAILED DESCRIPTION OF PREFERRED EMBODIMENTS

Figure 1:
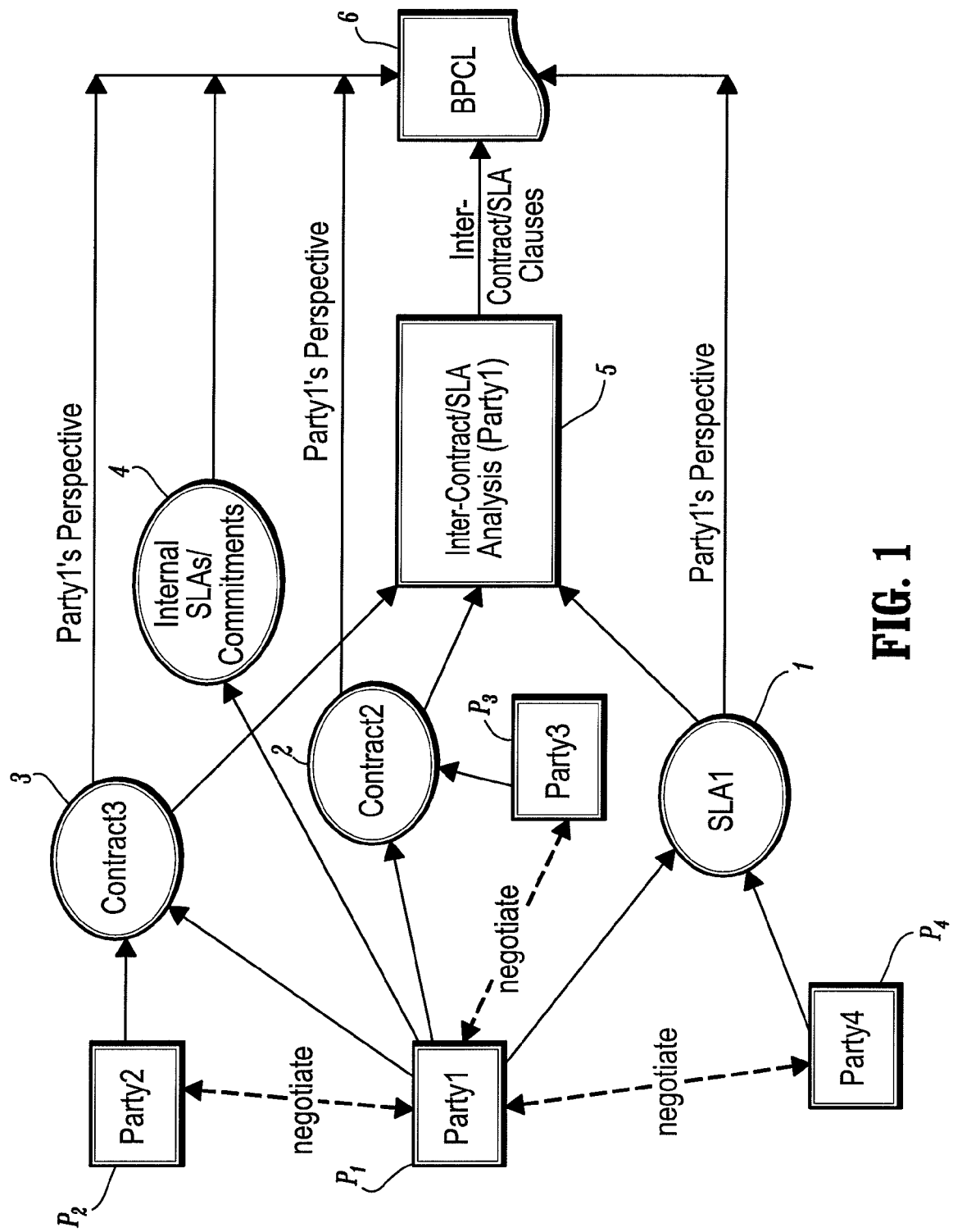
FIG. 1 is a flow diagram illustrating a method for creating BPCL documents according to an embodiment of the invention.

The present invention relates to systems and methods for providing e-business process management. Systems and methods according to the invention for providing e-business process management preferably employ mechanisms for monitoring and controlling business level SLAs using probe points, KPIs (Key Performance Indicators) and business commitments. A BPCL (Business Process Commitment Language) according to an embodiment of the invention is used to declaratively model relationships among external and internal parties and specify business commitments. BPCL can be used by a business process management (BPM) system to configure, monitor, and control business processes based on business commitments.

The following detailed description of preferred embodiments is divided into the following sections for ease of reference:

Section I describes a general overview of business process management systems and methods according to the invention;

Section II describes the concept of business commitment according to the invention;

Section III describes BPCL on a conceptual level for specifying business commitments, as well as preferred structures and components of BPCL and an exemplary XML Schema Definition (XSD) for defining a content model of BPCL according to an embodiment of the invention;

Section IV describes systems and methods according to various embodiments of the invention for monitoring and controlling business level SLAs using probe points, KPIs (Key Performance Indicators) and business commitments, which can be used for implementing Business Process Management platforms; and Section V describes several exemplary business processes that can be implemented using business commitments according to the invention.

Section I—Overview

In general, the present invention is directed to business process management systems and methods that can be implemented for managing various e-services that are associated with a "dynamic e-business." A "dynamic e-business" refers to an integrated set of applications and procedures that constitute cross-enterprise business processes such as customer relationship management (CRM) and supplier chain management (SCM), for example. Since a business entity can utilize multiple e-services to run its business, it is preferably to manage such e-services in a uniform manner. Business process management systems and methods according to the invention can effectively coordinate the execution of multiple applications, wherein audit trails and exceptions generated from such applications are preferably managed from a business-level view.

In a preferred embodiment of the invention, business process management on a business-level comprises centralized management of business relationships among business entities such as service providers, service consumers, and internal departments, wherein business commitments are defined to capture the essence of business relationships in e-services. As explained in further detail below, business commitments are commitments related to business issues such as service levels in service agreements and terms and conditions in procurement contracts. Business commitments are preferably specified using an XML-based language referred to herein as BPCL (Business Process Commitment Language) and are used to monitor and control the execution status of e-services.

Advantageously, business commitments and BPCL according to embodiments of the invention provide mechanisms for model-based management for dynamic e-business solutions. In particular, business commitments and BPCL provide a mechanism to effectively model business relationships among various trading partners and interactions among internal parties and to centrally manage business commitments from/to multiple parties. In other words, business commitments and BPCL enable a global/integrated view of various business relationships to be managed, thus leading to an optimal solution of business relationship management.

Section II—Business Commitments

This section describes the concept of business commitment according to the invention. In general, a commitment is an agreement or pledge to do something (or not to do something) in the future within certain bounds. In accordance with the invention, a business commitment is broadly defined as a commitment related to business issues. Business commitments can be between trading partners or external parties such as business partners, service requesters, and service providers (external commitments), or between internal parties within a business enterprise (internal commitments). Business commitments can exist in many forms, such as business contracts between two business partners, service level agreements (SLA) among service providers and service requesters, and/or internal SLAs specified by departments (which is to be contrasted with conventional SLA approaches in which only two primary parties are involved).

Business commitments according to the invention are preferably viewed in the context of business process management. A business process is a completely coordinated thread of serial and parallel activities that collectively realize a business objective or policy goal. As a result, a business process is able to deliver value to both internal and external customers. Business process management (BPM) is the capability to discover, design, simulate, deploy, execute, optimize, and analyze the end-to-end processes.

A set of business commitments establishes a management agreement of a BPM (business process management) platform at a business process level, wherein explicit "actions" are associated with the business commitments. At run-time, if agreements/guarantees (defined by the business commitments) have been violated, one party promises to take some action(s), either to notify related parties or to "remedy" the violation. A BPM will configure, control, and monitor business processes based on business commitments as specified using BPCL according to the invention.

The concepts of business commitments, contracts, SLAs are related, but with different focus. A contract or SLA contains the terms and conditions that all parties have mutually agreed upon. A commitment is usually directional, meaning a commitment has one initiator and one receiver. For example, in a shipping SLA, a carrier promises (to the service requestor) to ship goods within X days. On the other hand, a service requestor promises (to the carrier) to pay the bill within Y days. During the execution, commitments may be violated for various reasons (unforeseeable events or violated intentionally by one party). Therefore, it is common for both parties to agree to take certain "actions" when their mutual commitments are unfulfilled. Therefore, in accordance with the present invention, "action" is a primary focus. The agreements (embodied by business commitments) are monitored and violations are detected. As explained below, monitoring and controlling business commitments in accordance with the present invention are based on logical expressions (conditions) over the business data concern monitoring parties.

Section III—Business Process Commitment Language (BPCL)

The following section describes BPCL on a conceptual level for specifying business commitments, preferred structures and components of BPCL, and an exemplary XML Schema Definition (XSD) for defining a content model of BPCL according to an embodiment of the invention.

Business commitments are defined jointly by business process owners and an owner of a BPM platform on which the business processes are executed. A BPM system according to the invention will monitor not only the execution of an individual contract, but also the relationship among these contracts. The relationship among multiple contracts/SLA is referred to herein as "inter-contract/SLA clauses". The management of inter-contract/SLA clauses is beyond the scope of a conventional single business process management system.

Referring now to FIG. 1, a diagram illustrates a method for creating a BPCL. It is assumed that Party1 (P1) is a primary party, which negotiates with multiple parties (P2, P3 and P4). The result of the negotiation between P1 and P4 is a SLA1 (1) (assuming P1 and P4 have negotiated a service agreement). The results of the negotiation between P1 and P3, and the negotiation between P1 and P2 are Contract2 (2) and Contract3 (3), respectively, (assuming such negotiations are based on general business contracts). P1 may have internal SLAs/Commitments (4) that describe obligations of various internal departments. Since SLA1 (1), Contract2 (2) and Contract3 (3) are the results of separate negotiations, such results are processed via Inter-Contract/SLA Analysis (5) to generate possible inter-contract/SLA clauses. Then, as depicted in FIG. 1, the resulting inter-contract/SLA clauses are combined with internal SLAs/Commitments (4), SLA1, Contract2 and Contract3 (these are all from P1's perspective) to form a BPCL (6). It is to be understood that the method described in FIG. 1 may be manual or automated.

In accordance with a preferred embodiment of the invention, BPCL is preferably based on XML syntax for specifying business commitments. In addition, BPCL is preferably based on an ECA (Event-Condition-Action) paradigm, wherein once an "event" has occurred, the "condition" is evaluated and if the "condition" is evaluated to be true, one or more "actions" are taken. BPCL extends the ECA model in various ways. In general, the "condition" part of the ECA model comprises a logical expression based on KPIs (Key Performance Indicators) and commitment variables. Commitment variables, in general, comprise threshold values that can be dynamically set by business analysts. Furthermore, BPCL comprises "commitment profiles", which provide values for condition matching variables and commitment variables. A "commitment profile" provides a way to separate the logic portion of a business commitment from the data portion of the business commitment. In addition, the "action" component of the ECA model is expanded to an "action set" where a collection of related actions can be executed either sequentially or in parallel.

More specifically, in accordance with an embodiment of the present invention, systems and methods for specifying a BPCL and for monitoring business commitments via BPCL are supported by KPI (Key Performance Indicator) and probe points. During the execution of a typical e-service, there are many data exchanged between a service provider and a service consumer. KPI provides a mechanism to isolate business commitment monitoring from the low-level details of e-service implementation. A KPI is a specified parameter of an e-service that can be used to manifest the status of the e-service. In other words, a KPI is a piece of business process data that provides an indication of the performance (or status) of a business process. In accordance with the present invention, the KPIs are monitored and controlled by a BPCL-compliant system. It is to be understood that not all data generated by a business process is deemed a KPI. Preferably, the selection and definition of KPIs are determined by business analysts who intimately understand the business (or service).

By way of example, KPIs may come directly from contracts. For instance, in a shipping contract between a carrier and service requester, the shipping schedule and payment schedule may be KPIs. Furthermore, KPIs may require additional computations based on lower level metrics. For example, in an IT service, system availability could be computed based on the continuous probing of the system over a certain period of time. Moreover, KPIs can be derived from the information gathering from business contexts, which is a part of the business environment intentionally externalized by the owners of the business processes.

The concept of KPIs has been defined in domains such as Balanced Scorecard, Business Intelligence, and Supply Chain Management, to specify metrics that can be used to measure the performance of enterprises and business processes. In the case of balanced scorecard, KPIs come with four perspectives of business metrics (i.e., performance measurement): finance, customer satisfaction, internal processes, and innovation and improvement. KPIs are preferably measurable, otherwise KPIs could not be monitored, computed, and controlled. Examples of measurable metrics, hence KPIs, in the supply chain domain include the inventory level and the cycle time of a business process. In accordance with the invention, once KPIs extracted from business processes have been determined, the KPIs can be used to construct meaningful relationships among business entities. A hypothetical business commitment could be, for example, "if $KPI.sub.1$, from business process 1 is greater than $KPI.sub.2$ from business process 2, notify the administrator."

Furthermore, in accordance with the invention, a "probe point" provides the linkage between business process modeling/execution languages and BPCL. A probe point comprises a logical locator (inside a concrete business process) that would report the related process data to the process monitoring/control system.

The following declarative fragments collectively illustrate an exemplary XML Schema Definition (XSD) for defining components and structure of an exemplary XML-based BPCL document according to an embodiment of the invention.

In particular, the following XSD fragment illustrates an exemplary type definition for elements of a BPCL document according to an embodiment of the present invention:

```
1 <!-- BPCLType definition -->
<xsd:complexType name="BPCLType">
    <xsd:sequence>
        <xsd:element name="Party" type="bpcl:PartyType"
            minOccurs="0" maxOccurs="unbounded"/>
```

```
            -continued

<xsd:element name="BusinessProcess"
            type="bpcl:BPType" minOccurs="0"
            maxOccurs="unbounded"/>
        <xsd:element name="KPI" type="bpcl:KPIType"
            minOccurs="0" maxOccurs="unbounded"/>
        <xsd:element name="BusinessEvent" type="bpcl:BEType"
            minOccurs="0" maxOccurs="unbounded"/>
        <xsd:element name="BC" type="bpcl:BCType"
            minOccurs="0" maxOccurs="unbounded"/>
        <xsd:element name="CommitmentProfile"
            type="bpcl:CommitmentProfileTypes" minOccurs="0"
            maxOccurs="unbounded"/>
    </xsd:sequence>
</xsd:complexType>
<xsd:element name="BusinessSLA" type="bpcl: BPCLType/>
```

In general, as illustrated in the above exemplary XSD fragment, the element BusinessSLA of type BPCLType is a root element of a BPCL definition. A BusinessSLA comprises elements named Party, BusinessProcess, KPI, BusinessEvent and BC. As a convention, the BPCL elements and types are defined in the namespace bpcl.

The Party element enables descriptive information to be included in a BPCL document regarding parties that are participating in a business process of a business process management (BPM) system. The BusinessProcess element enables an abstract description of a targeted business process in a BPCL document The KPI element enables key performance indicators or parameters that indicate the status of business processes to be included in a BPCL document. The BusinessEvent element enables events to be included in a BPCL document, which provide a triggering point for evaluating the logic expressions inside individual business commitments. The BC element (Business Commitment) is a key element of BPCL. The BC element enables various information such as BCIdentifier, TriggeringEvent, CommitmentLevel, Validity, logic Expression on KPI, Initiator, Receiver, Action, and AltAction, to be specified in a BPCL document, wherein BCIdentifier is an identification for the commitment, TriggeringEvent indicates which event would trigger the evaluation of the commitment. The element Action is used to describe the action(s) to be taken when the logical expression is evaluated to be true, and AltAction indicates alternative action(s) to be taken when the logic Expression is evaluated to be false.

Each of the above-named elements in the exemplary BPCLType XSD definition includes a type attribute that refers (points) to a name of a complex type that is used to define the element. For instance, the following exemplary XSD fragment defines the complex element PartyType, which is pointed to by the Party element of the above BPCLType definition:

```
<xsd:complexType name="PartyType">
    <xsd:sequence>
        <xsd:element name="PartyIdentifier"
            type="bpcl:PartyIdentifierType"
            maxOccurs="unbounded"/&- gt; <xsd:element name="Contact"
            type="bpcl:ContactInformationType"/>
        <xsd:element name="RolePlayer" type="xsd:string"
            minOccurs="0" maxOccurs="unbounded"/>
    </xsd:sequence>
    <xsd:attribute name="name" type="xsd:string"/>
</xsd:complexType>
```

As illustrated, the complex element PartyType is defined as having a sequence of child elements in the declared order of PartyIdentifier (identifier information), Contact (contact information), and zero to many occurrences of RolePlayer. In addition, an optional name attribute is defined having a character string type. There is one primary party that owns the business commitment hub. There are one to many parties that are participating in the activities of business commitment hub.

Next, the following exemplary XSD fragment defines the complex element BPType, which is pointed to by the BusinessProcess element of the above BPCLType definition:

```
<!-- abstract business process model -->
<xsd:complexType name="BPType">
    <xsd:sequence>
        <xsd:element name= "ProcessID" type="xsd:string"/>
        <xsd:element name= "Activity" type="bpcl:ActivityType"
            minOccurs="0" maxOccurs= "unbounded"/>
        <xsd:element name= "ControlFlow"
            type="bpcl:ControlFlowType" minOccurs="0" maxOccurs=
            "unbounded"/>
        <xsd:element name= "Dataflow" type="bpcl:DataFlowType"
            minOccurs="0" maxOccurs= "unbounded"/>
        <xsd:element name="Description" type="xsd:string"/>
        <xsd:element name="OverviewURL" type="xsd:anyURI"/>
        <xsd:element name="ProcessOwner" type="xsd:string"/>
        <xsd:element name="ParticipantParty" type="xsd:string"
            maxOccurs= "unbounded"/>
        <xsd:element name="BPM" type="bpcl:BPMType"/>
    </xsd:sequence>
</xsd:complexType>
```

As illustrated, the complex element BPType is defined as having a sequence of child elements in the declared order of ProcessID, zero or more occurrences of Activity, zero or more occurrences of ControlFlow, zero or more occurrences of DataFlow, Description, OverviewURL, ProcessOwner (party that owns the process), one or more occurrences of ParticipantParty, and BPM (to specify the type of BPM system).

Next, the following exemplary XSD fragment defines the complex element KPIType, which is pointed to by the KPI element of the above BPCLType definition:

```
<xsd:complexType name="KPIType">
    <xsd:sequence>
        <xsd:element name="KPIName" type="xsd:string"/>
        <xsd:element name="KPIType" type="xsd:string"/>
        <xsd:element name="KPICategory"
            type="bpcl:KPICategoryType" minOccurs="0"
            maxOccurs="unbounded"/>
        <xsd:choice>
            <!--got the value from a business process -->
            <xsd:element name="ProcessAssociation"
                type="bpcl:ProcessAssociationType"/>
            <xsd:element name="EventName" type="xsd:string"/>
            <xsd:element name="InvocationURL"
                type="xsd:anyURI"/>
            <xsd:element name="ObjectMethodName"
                type="xsd:string"/>
            <xsd:element name="QueryString" type="xsd:string"/>
            <!-- computing value based on other KPIs -->
            <xsd:element name="Computation"
                type="bpcl:FunctionType"/>
            <!-- deriving value from a basic KPI -->
            <xsd:elementname="ValueDerivation"
                type="bpcl:ValueDerivationType"/>
        </xsd:choice>
    </xsd:sequence>
</xsd:complexType>
```

As illustrated in the above example for the complex element KPIType, there are three different ways to get the value for KPI: directly from a business process, computing the value based on other KPIs, and deriving value from a basic KPI.

Next, the following exemplary XSD fragment defines the complex element BEType, which is pointed to by the BusinessEvent element of the above BPCLType definition:

```
<xsd:complexType name="BEType">
    <xsd:sequence>
        <xsd:element name="EventName" type="xsd:string"/>
        <xsd:element name="EventType" type="xsd:string"/>
        <xsd:element name="ProcessID" type="xsd:string"/>
            <!-- event source: either Sender (directly come from a
            sender) or Timer (come from a timer) -->
            <xsd:choice>
                <xsd:element name="Sender" type="xsd:string"/>
                <xsd:element name="Timer"
                type="bpcl:TimerType"/>
            </xsd:choice>
        <xsd:element name="Receiver" type="xsd:string"
        minOccurs="0"/>
        <xsd:element name="EventAttributes"
        type="bpcl:EventAttributesType"
          minOccurs="0" maxOccurs="unbounded"/>
    </xsd:sequence>
</xsd:complexType>
```

As illustrated, the complex element BEType is defined as having a sequence of child elements in the declared order of EventName, EventType, ProcessID, Sender or Timer (choice for event source), zero or more occurrences of Receiver, and zero or more occurrences of EventAttributes. In the exemplary embodiment, an event mode comprises several event sources: Sender (directly come from a sender) and Timer (come from a timer). Information that is specific to an event is stored within the EventAttributes.

Next, the following exemplary XSD fragment defines the complex element BCType, which is pointed to by the BC (business commitment) element of the above BPCLType definition:

```
<xsd:complexType name="BCType">
    <xsd:sequence>
        <xsd:element name="BCIdentifier" type="xsd:string"/>
        <xsd:element name="TriggeringEvent"ty- pe="xsd:string"/>
        <xsd:element name="CommitmentLevel"
        type="bpcl:CommitmentLevelType"/>
        <xsd:element name="Validity" type="bpcl:PeriodType"/>
        <xsd:element name="Expression"
        type="bpcl:LogicExpressionType"/>
        <xsd:element name="Initiator" type="xsd:string"/>
        <xsd:element name="Receiver" type="xsd:string"/>
        <xsd:element name="Action" type="bpcl:ActionType"
          minOccurs="0" maxOccurs="unbounded"/>
        <xsd:element name="AltAction" type="bpcl:ActionType"
          minOccurs="0" maxOccurs="unbounded"/>
    </xsd:sequence>
</xsd:complexType>
```

As illustrated, the complex element BCType is defined as having a sequence of child elements in the declared order of BCIdentifier, TriggeringEvent, CommitmentLevel, Validity, (logic) Expression, Initiator, Receiver, zero or more occurrences of Action and zero or more occurrences of AltAction.

Actions defines one or more actions to be taken when the logical Expression is evaluated to be true. AltActions defines one or more actions to be taken when the logical Expression is evaluated to be false. A commitment is directional, so it is preferable to indicate the Initiator and the Receiver. Preferably, there are several possible values for CommitmentLevel including individual level (commitment for each transaction instance) and process level (based on the aggregated result over a certain period of time).

Next, the following exemplary XSD fragment defines the complex element ActionType, which is pointed to by both the Actions and AltActions elements of the BCType element definition:

```
<xsd:complexType name="ActionType">
    <xsd:sequence>
        <xsd:element name="ActionCategory"
        type="bpcl:ActionCategoryType"/>
        <xsd:element name="ProcessID" type="xsd:string"/>
        <xsd:element name="ActivityName" type="xsd:string"/>
        <xsd:element name="Parameter" type="bpcl:NameValueType"
          minOccurs="0" maxOccurs="unbounded"/>
        <xsd:element name="ExecutionMode" type =
        "bpcl:ExecutionModeType"/>
    </xsd:sequence>
</xsd:complexType>
```

As illustrated, the complex element ActionType is defined as having a sequence of child elements in the declared order of ActionCategory, ProcessID, ActivityName, zero or more occurrences of Parameter, and ExecutionMode. Preferably, the element ExecutionModeType is defined using an enumeration constraint to limit the content of such element to several valid values including "Sequentially" (sequential execution of Actions) and "InParallel" (parallel execution of Actions).

Next, the following exemplary XSD fragment defines the complex element CommitmentProfileType, which is pointed to by the CommitmentProfile element of the above BPCLType definition:

```
<xsd:complexType name="CommitmentProfileType">
    <xsd:sequence>
        <xsd:element name="ConditionMatchingVariable"
        type="bpcl:NameValueType" minOccurs="0"
        maxOccurs="unbounded"/>
        <xsd:element name="CommitmentVariable"
        type="bpcl:NameValueType" minOccurs="0"
        maxOccurs="unbounded"/>
    </xsd:sequence>
</xsd:complexType>
```

As illustrated, the complex element CommitmentProfileType is defined as having a sequence of child elements in the declared order of zero or more occurrences of ConditionMatchingVariable, and zero or more occurrences of CommitmentVariable.

As noted above, the CommitmentProfile describes condition matching variables and commitment variables. The commitment profile separates the logic portion of a commitment from the data portion of the commitment, which enables scalability in composing large BPCL documents. The logic portion of a commitment comprises a logic expression over KPIs and parameters. The data portion of a commitment provides values for such parameters, and the data portion comprises a collection of data called commitment profiles. The data portion can reside in a database table or other separate XML documents. In this manner, the core portion of BPCL can be small and easy to understand. Each commitment profile comprises several components including (i)

identifying information and (ii) threshold information. The identifying information is referred to as ConditionMatchingVariable, and the threshold information is referred to as CommitmentVariable. As suggested by the names, the value for ConditionMatchingVariable is used as conditions to retrieve the value for CommitmentVariable. The CommitmentVariables participate in the evaluation of the logic portion of a commitment. The results of such evaluation will determine whether one or more actions should be taken.

Section IV—BPM Systems and Methods

The following section describes systems and methods according to various embodiments of the invention for monitoring and controlling business level SLAs using probe points, KPIs (Key Performance Indicators) and business commitments, which can be used for implementing Business Process Management platforms.

It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., hard disk, magnetic floppy disk, RAM, CD Rom, DVD, ROM and flash memory), and executable by any device or machine comprising suitable architecture.

It is to be further understood that because the constituent system modules and method steps depicted in the accompanying Figures are preferably implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 2:
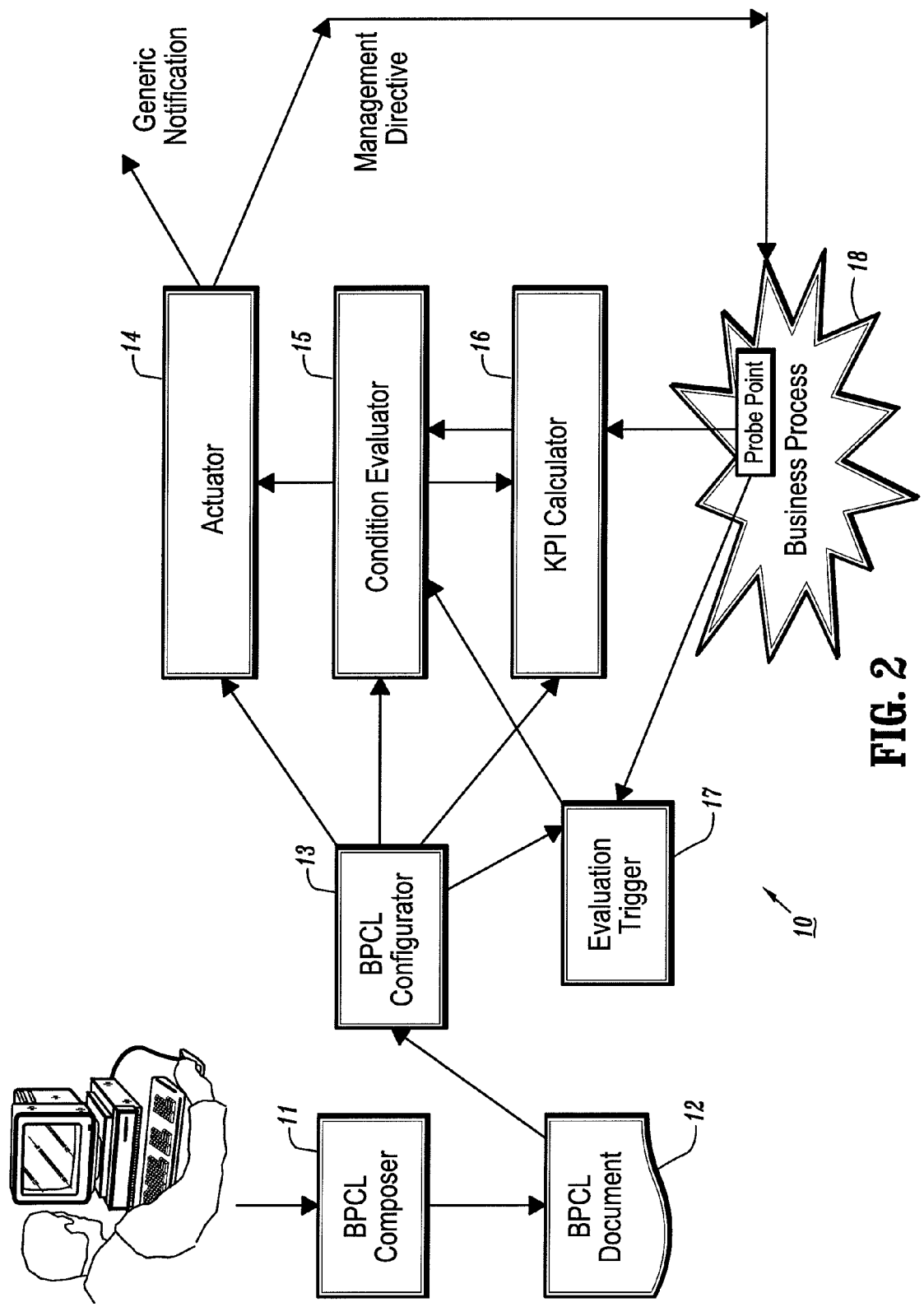
FIG. 2 is a diagram illustrating a system and method for monitoring and controlling business level SLAs via probe points, KPIs and business commitments, according to an embodiment of the present invention.

Referring now to FIG. 2, a diagram illustrates a system for monitoring and controlling business level SLAs via probe points, KPIs and business commitments, according to an embodiment of the present invention. It is to be understood that FIG. 2 also depicts a high-level flow diagram of a method for monitoring and controlling business levels SLA according to an embodiment of the invention. In general, the system (10) architecture comprises several integrated systems of components including (i) build-time system components and (ii) run-time system components.

During build-time, a BPCL Composer (11) is used for creating one or more BPCL documents (12). Business analysts will compose BPCL documents using the composer (11) tool. Preferably, the BPCL composer (11) comprises a visual editing tool to compose valid BPCL documents. In a preferred embodiment, the BPCL Composer (11) comprises an Eclipse-based visual development tool, which displays (via GUI) the relationship among probe points, KPIs and business process commitments. The final results of editing are preferably stored as BPCL documents in XML format.

The system (10) run-time components comprise a BPCL configurator (13), an actuator (14), a condition evaluator (15), a KPI calculator (16) and an evaluation trigger (17). The BPCL configurator (13) processes BPCL documents and other configuration files to configure the system components (14-17). Preferably, the configurator (13) comprises a program that reads a BPCL documents and passes configuration information to the appropriate system components. The actuator (14) comprises a program for sending generic notifications or invoking management directives that may alter the execution of a running business process (18). The KPI calculator (16) comprises a program that determines KPI values and the condition evaluator (15) comprises a program that evaluates logical conditions. The evaluation trigger (17) determines a "trigger" to invoke the condition evaluator (15). Preferably, several types of triggers are implemented including "alarm-based" and "event-based" triggers. For the alarm-based trigger, the instructions are from the BPCL configurator (13) which reads the BPCL document, whereas event-based triggers are based on probe messages.

During run-time of the system (10), SLA monitoring occurs when probe points are activated during execution of the running business process (18). In particular, probe points that are inserted into the business processes to be monitored are activated and send messages to the KPI calculator (16). The KPI calculator (16) determines the KPI values. At the same time, the probe points also send messages to the evaluation trigger (17), and the evaluation trigger (17) requests the condition evaluator (15) to evaluate the associated logical condition(s). The condition evaluator (15) in turn requests KPI values from the KPI calculator (16) and the KPI calculator (16) sends the data to the condition evaluator (15). The condition evaluator (15) then instructs the actuator (14) to take appropriate actions. The actuator (14) calls a generic notification mechanism, which in turn calls an actual implementation of the notification, e.g., email, instant message, etc. The actuator (14) may invoke one or more management directives that may alter the execution of the underlying business process.

Therefore, in summary, when a probe point is activated, KPI values are calculated and then (logical) conditions are evaluated. The result from the condition evaluation determines whether or not a SLA violation has occurred. If there is such a violation, either generic notification is sent to appropriate parties, or management directives are routed back to the business process to manipulate the execution of the business process.

Figure 3:
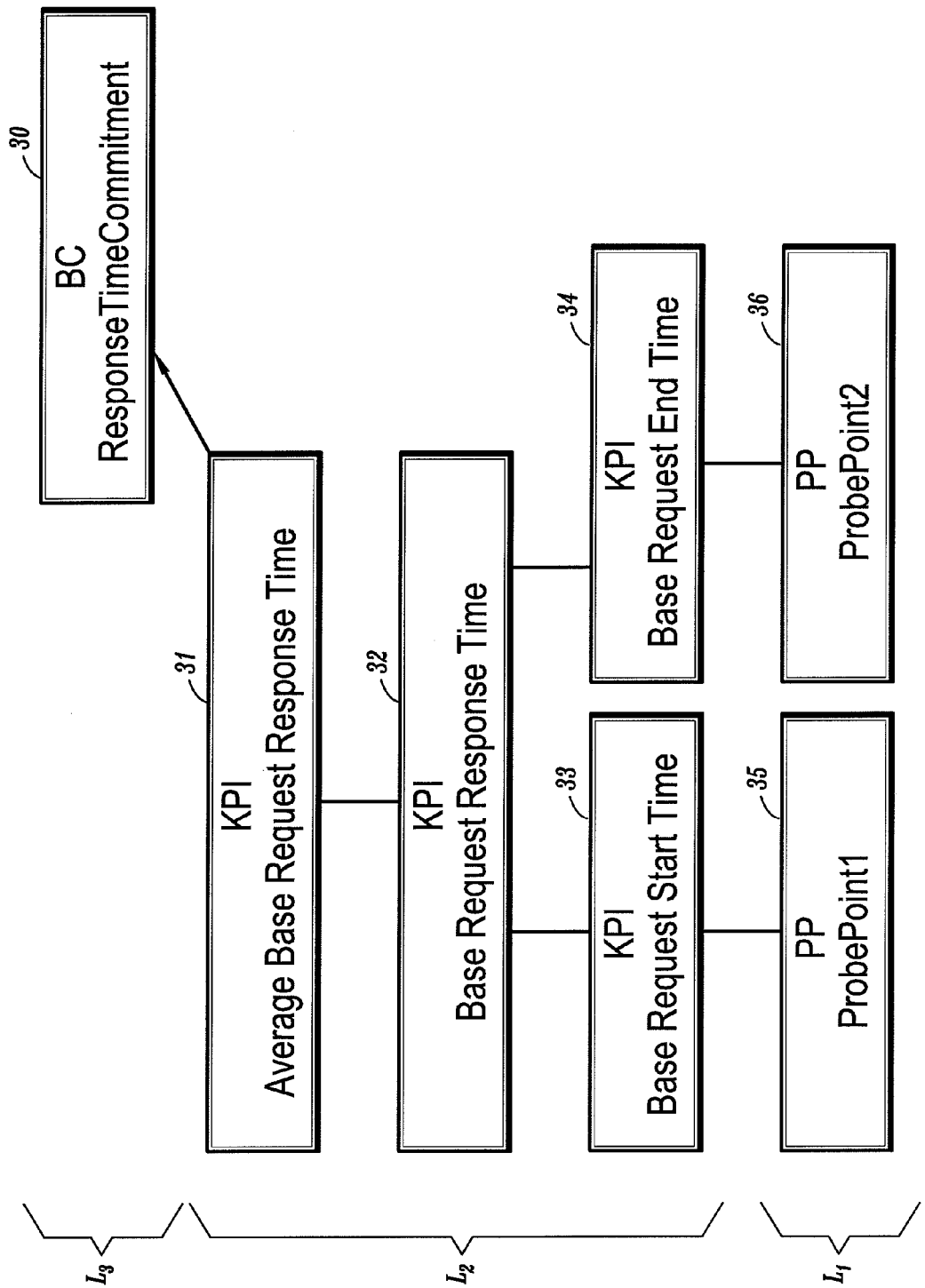
FIG. 3 is an exemplary diagram of a BPCL document that is composed using a BPCL composer according to an embodiment of the invention.

FIG. 3 is an exemplary diagram of a BPCL document that is composed using a BPCL composer according to an embodiment of the invention. As noted above, the BPCL composer is preferably an Eclipse-based development tool that allows business analysts to visually define different components for BPCL documents and show the relationships among different components of the BPCL document. As is known in the art, the Eclipse Platform is a Java-based, open-source software platform, which is designed for building integrated development environments (IDEs) that can be used to create various types of applications, such as e-business applications. The Eclipse Platform is built on a mechanism for discovering, integrating, and running modules called plug-ins. A tool provider can develop a tool as a separate plug-in that operates on files in the Eclipse "workspace" and manifests a tool-specific UI in the Eclipse "workbench". The Eclipse workbench is an open source initiative to provide a platform upon which tool builders can develop their products. With all common functionality available within the workbench, tool builders can concentrate on developing plug-ins that only include the core business logic. The Eclipse platform enables developers to use software tools from multiple suppliers together, allowing developers to integrate business processes that are used to create e-business applications.

In the exemplary diagram of FIG. 3, three basic layers are shown for a BPCL definition: a Probe Point layer (L1), a KPI layer (L2) and a Business Commitment layer (L3). Since KPI definitions are recursive, the KPI layer (L2) may actually have several physical layers. For example, in FIG. 3, three KPI layers are shown for KPI layer (L2). The KPI defined in the top KPI layer (31) is used in the construction of a business commitment (30), while the KPIs (32, 33 and 34) that are defined below the top level KPI (31) are used to compute the "Average Base Request Response Time" value for the top level KPI (31). The exemplary document comprises two probe points (35, 36) that are defined to activate monitoring of a "base request start time" and "base request end time", respectively. Therefore, as shown in FIG. 3, a business commitment definition depends on KPIs, and the definition of KPIs depends on probe points. There is a dependency chain, e.g., "probe points.fwdarw.KPIs.fwda-rw.business commitments." When there are multiple probe points, KPIs and business commitments, their interactions form a graph structure.

Figure 4:
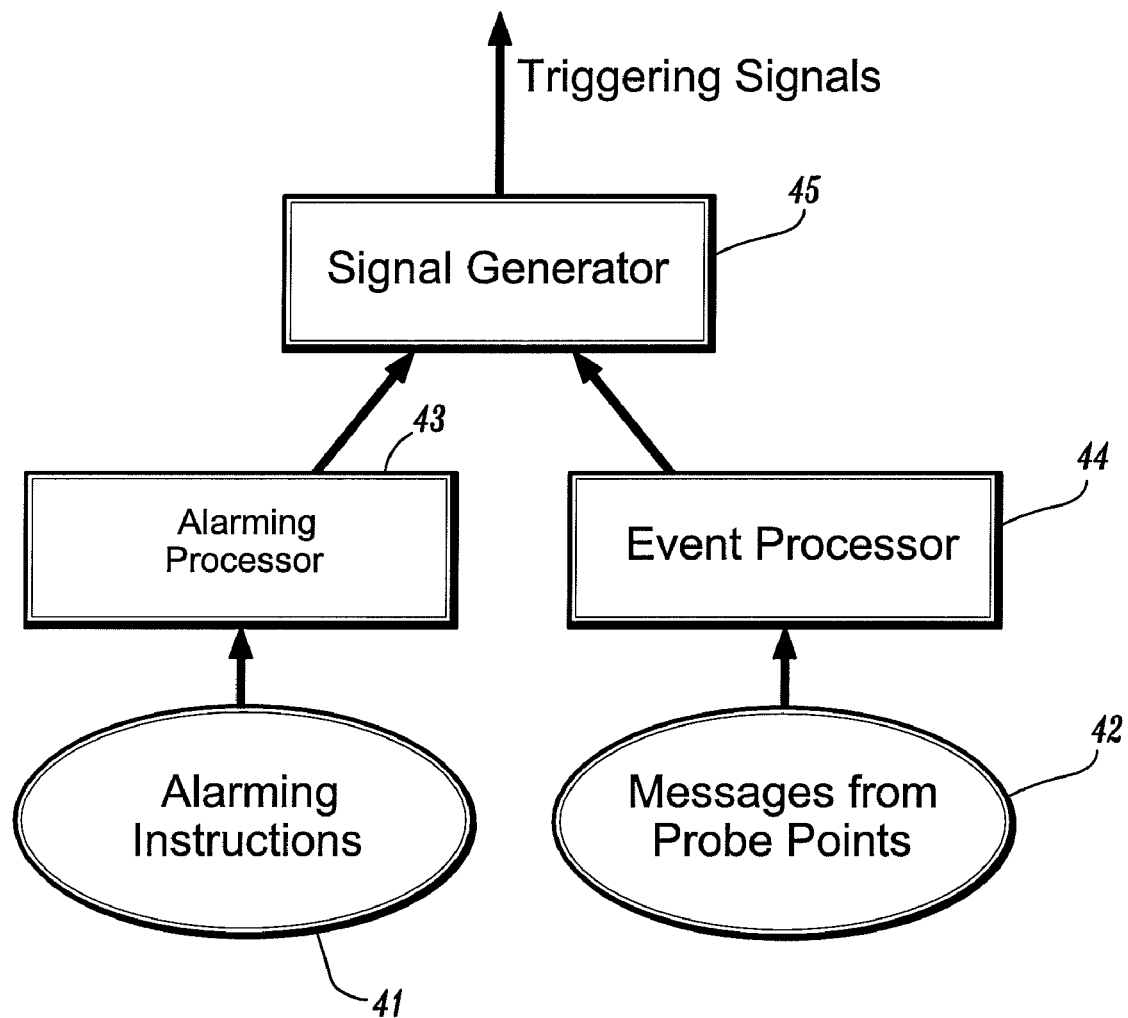
FIG. 4 is a flow diagram illustrating a method for generating triggering signals by an evaluation trigger module, according to an embodiment of the present invention.

FIG. 4 is a diagram that illustrates an architecture of the evaluation trigger ((17) according to an embodiment of the present invention. FIG. 4 further depicts a mode of operation of the evaluation trigger (17) according to the invention. As noted above, there are preferably several sources for signals, such as alarming instructions (41) and messages from probe points (42). Alarming instructions comprise time-based specifications for periodical occurrences of certain events. For example, by the end of each week (e.g., each Friday afternoon at 6:00 pm) or at the beginning of each month (e.g., 9:00 am at the first day of the month), the system can determine the average value for the cycle time and compare it with pre-defined threshold values. An Alarming processor (43) comprises a program that processes the alarming instructions (41) and sets appropriate systems/components to actually generate the signals via a signal generator (45).

Moreover, evaluation triggers (42) may be received from probe points. In this case, whenever a probe point receives information from an underlying business process, these messages are passed to an event processor (44). The event processor (44) performs event aggregations (e.g., determining how many messages have been received within a specified time period). The event processor (44) signals the signal generator (45) to then generate appropriate triggering signals.

Figure 5:
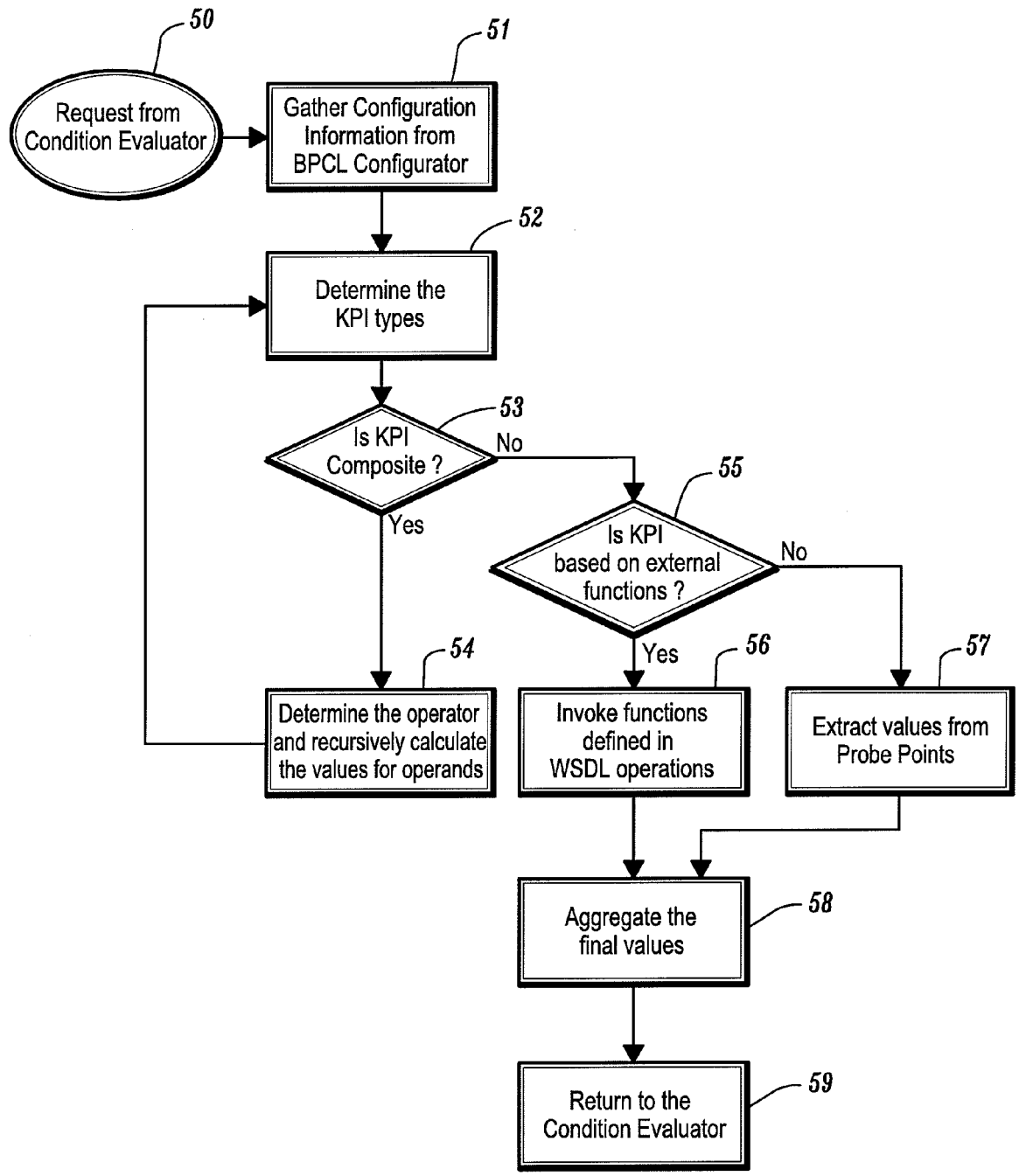
FIG. 5 is a flow diagram illustrating a method for determining KPI (Key Performance Indicator) values according to an embodiment of the present invention.

FIG. 5 is a flow diagram illustrating a method for determining KPI values according to an embodiment of the present invention. The flow diagram of FIG. 5 illustrates a mode of operation of the KPI calculator (16) of FIG. 2. Initially, upon receiving a request from the condition evaluator for KPI values (step 50), the KPI calculator (16) will process configuration information provided by the configurator (13) (step 51) and then determine the KPI type(s) (step 52). If the KPI is determined to be a composite type (affirmative determination in step 53), the operator will be determined and the values for the operands will be recursively calculated (step 54) and process flow returns to step 52.

On the other hand, if the KPI is not a composite type (negative determination in step 53), a determination is made as to whether the KPI is based on external functions (step 55). If the KPI is based on external functions (affirmative determination in step 55), then functions that are defined in WSDL (Web Service Description Language) operations, for example, are invoked (step 56) and the final KPI values are aggregated (step 58). On the other hand, if the KPI is not based on external functions (negative determination in step 55), the KPI values are extracted from the probe points (step 57) and the final values are aggregated (step 58). The final values are then returned to the condition evaluator (step 59).

Figure 6:
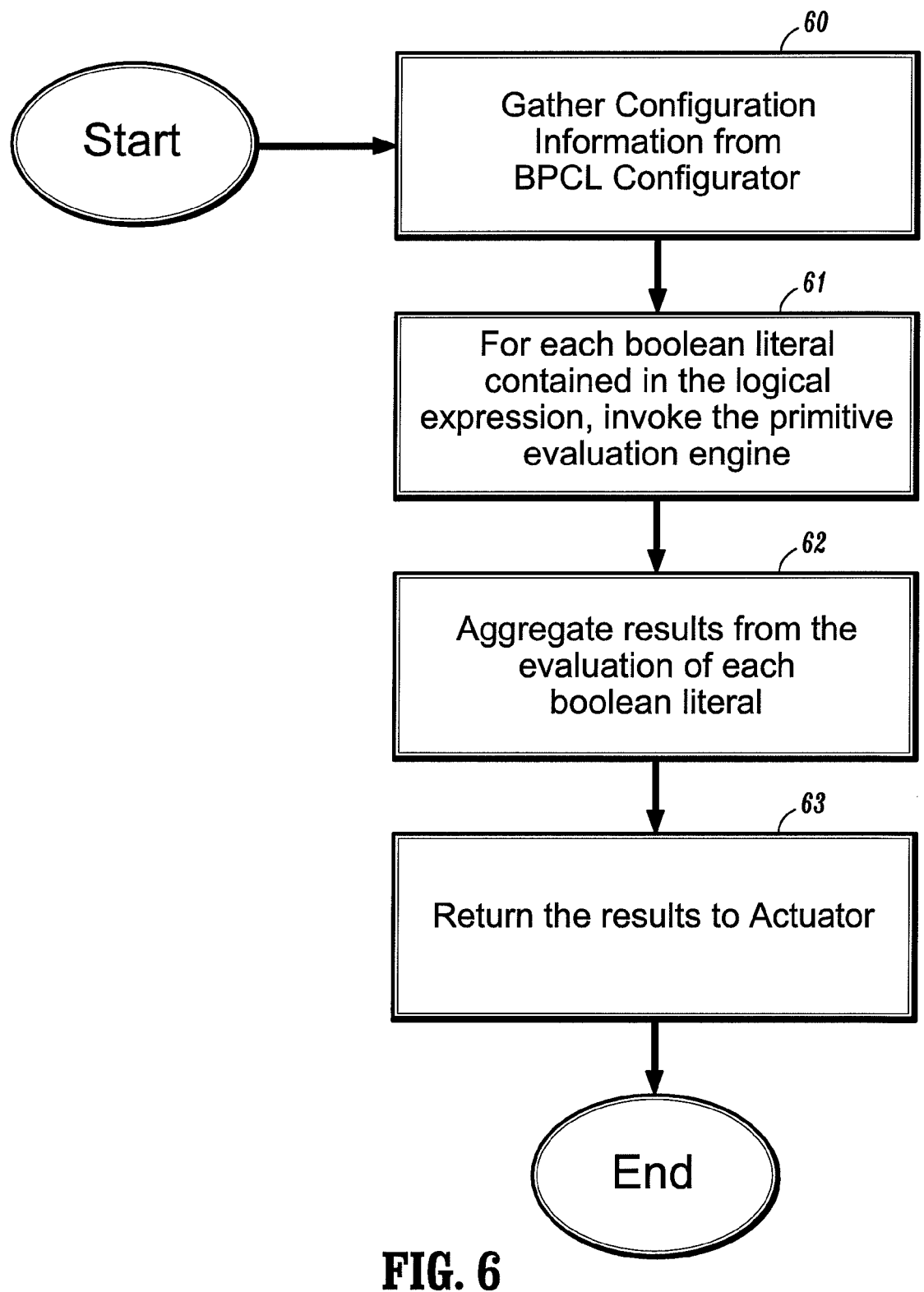
FIG. 6 is a flow diagram illustrating a method for evaluating logical conditions (associated with business commitments) in response to activated probe points during execution of a business process, according to an embodiment of the invention.

FIG. 6 is a flow diagram illustrating a method for evaluating logical conditions (associated with a business commitment) in response to activated probe points during execution of a business process, according to an embodiment of the invention. The flow diagram of FIG. 6 illustrates a mode of operation of the condition evaluator (15) of FIG. 2. Initially, upon receiving KPI values from the KPI calculator, condition evaluator (15) will process configuration information provided by the configurator (13) (step 60) and invoke a primitive evaluation engine for each Boolean literal contained in the logic expression (step 61). Then, the results from the evaluation of each boolean literal are aggregated (step 62) and the results are returned to the actuator (step 63).

Figure 7:
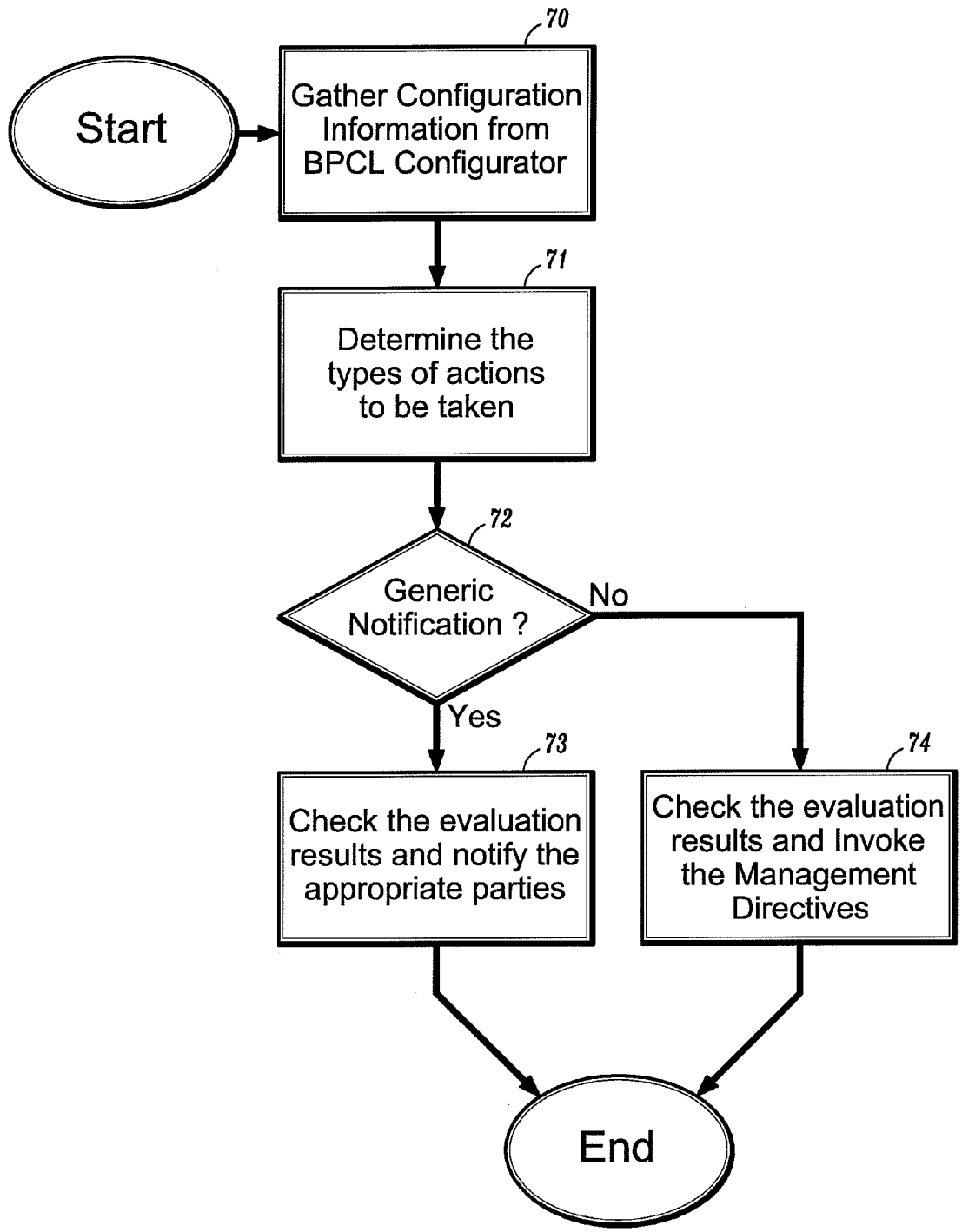
FIG. 7 is a flow diagram illustrating a method for determining actions to be taken in response to business-level SLA violations.

FIG. 7 is a flow diagram illustrating a method for determining actions to be taken in response to business-level SLA violations. FIG. 7 illustrates a mode of operation of the Actuator (14) of FIG. 2. As noted above, based on the results of the condition evaluation, the Condition Evaluator (15) instructs the Actuator (14) to take appropriate actions. The Actuator (14) will process configuration information provided by the configurator (13) (step 70) and determine the type(s) of action to be taken (step 71) in response to a request from the condition evaluator (15). If a generic notification is specified (affirmative determination in step 72), then the evaluation results will be checked and the appropriate parties will be notified (step 73). If a generic notification is not specified (negative determination in step 74), then the evaluation results will be checked and the appropriate management directive(s) will be invoked (step 74).

As discussed above with reference to FIG. 3, business commitment definitions are based on KPIs, and KPIs are defined by probe points. There is a dependency chain like "probe points->KPIs->business commitments." If there are multiple probe points, KPIs and business commitments, their interactions form a graph structure. If probe points are not available for some reasons (i.e., a partial breakdown of a portion of a business process), there is a need to have a way to detect the affected KPIs and business commitments.

Figure 8:
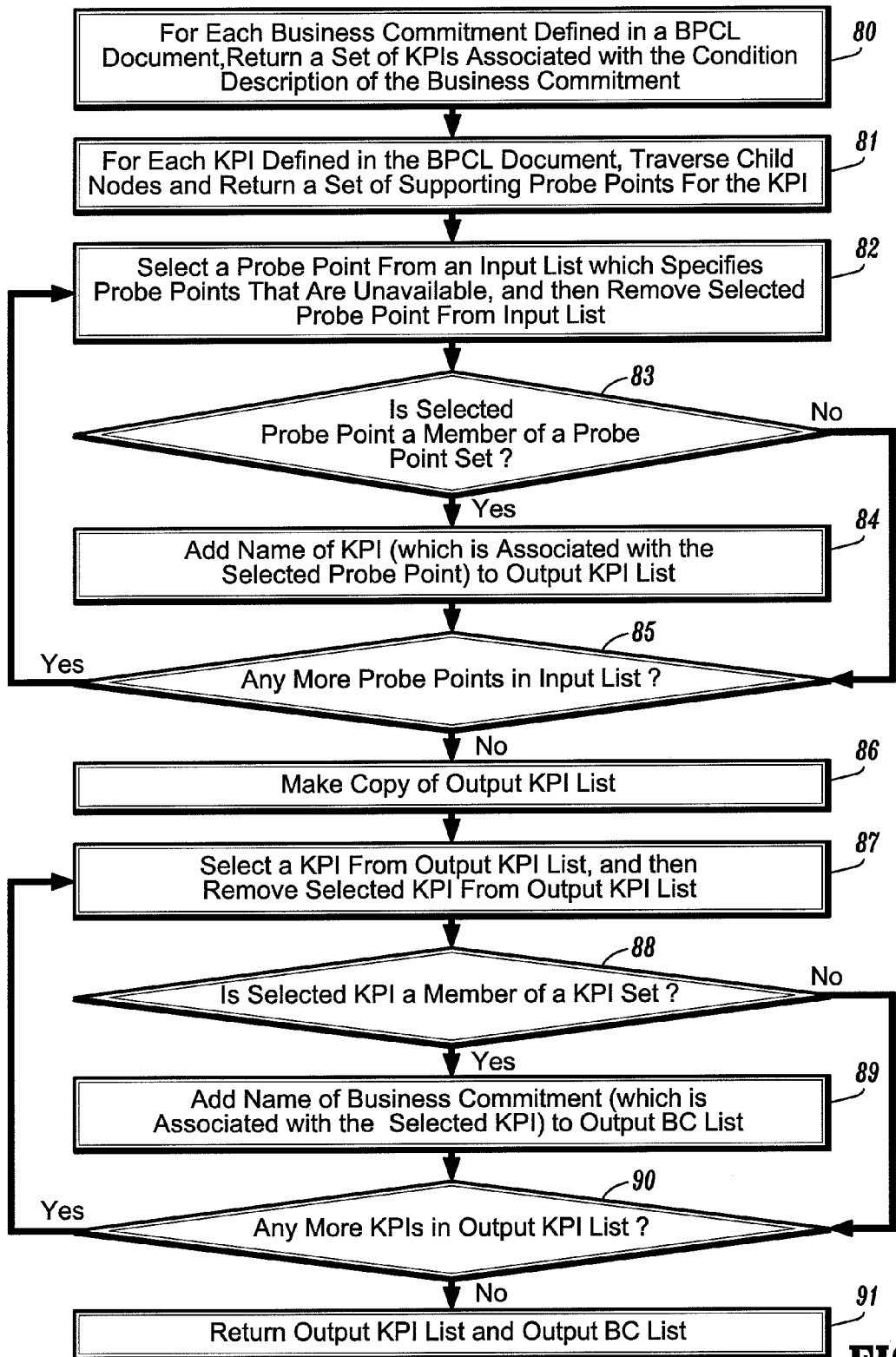
FIG. 8 is a flow diagram of a method for detecting dependencies between KPIs and business commitments when probe points are unavailable, according to an embodiment of the invention.

FIG. 8 is a flow diagram of a method for detecting dependencies between KPIs and business commitments when probe points are unavailable, according to an embodiment of the invention. With such method, the input comprises a list of probe points that are (temporarily or permanently) unavailable and the output comprises a list of KPIs and business commitments that are affected accordingly. Initially, for each business commitment defined in a BPCL document, a condition portion of the definition is analyzed and then a set of associated KPIs for each business commitment is returned (step 80). Let us call the sets $KPI_{BC1}$, $KPI_{BC2}$, ... $KPI_{BCn}$, etc.

Then, for each KPI defined in the BPCL document, the children nodes are traversed and a set of all the supporting probe points are returned for each KPI (step 81). Let us call the sets $PP_{KPI1}$, $PPK_{PI2}$, ... $PP_{KPIn}$, etc.

Then, one probe point from the input list is obtained (and removed from the list) (step 82). A determination is then made as to whether such probe point is a member of any of the sets of probe points $PP_{KPI1}$, $PP_{KPI2}$, ... $PP_{KPIn}$, etc. (step 83). If the probe point is a member of one of such probe point sets (affirmative determination in step 83), then the KPI name is added to the "output KPI list" (step 84). If there are more probe points in the input list (affirmative determination in step 85), the process is repeated (steps 82, 83, 84) until the input list is empty (negative determination in step 85).

When the input list of probe points is empty, a copy of the "output KPI list", $KPI_{output}$, is made (step 86). Then, one KPI is obtained from KPI.sub.output and removed from $KPI_{output}$ (step 87). A determination is then made as to whether the KPI obtained from the output list is a member of any of the KPI sets obtained in step 80 (step 88). If the KPI is a member of a set (affirmative determination in step 88), the corresponding business commitment name is added to the "output BC list" (step 89). If there are more probe KPIs in the output list $KPI_{output}$ (affirmative determination in step (90), the process is repeated (steps 87, 88, 89) until the output list is empty (negative determination in step 90) in which case the "output KPI list" and "output BC list" are returned (step 91).

Section V—Case Studies

The following section describes several exemplary business processes that can be implemented using business commitments according to the invention.

1. Insurance Hub

In the insurance industry, small businesses may buy insurance policies through independent agents. These independent agents then contract with insurance carriers that actually issue the insurance policies. Since it is time consuming for an independent agent to deal with many insurance carriers that potentially have different policies, it is cost effective to develop an insurance hub (using the business process management systems and methods herein) that can aggregate the results returned from multiple insurance carriers, and provide a uniform interface to independent agents. During business interactions between an insurance hub and insurance carriers, it is possible that the insurance hub may find that the policy rules provided by insurance carriers do not match the real world situation. The insurance hub may send a rule set revision request to insurance carriers. Since policy rule changes require human interventions, insurance carrier may take hours, even days, to process the rule set, and send the results back to the hub. From the viewpoint of an insurance hub, it is beneficial if each insurance carrier can return their corresponding result within an agreed upon period of time. The value for such time period could be a part of SLA/contract between the insurance hub and carriers.

In accordance with the present invention, several commitments can be defined in the above example. One commitment is from a carrier to the insurance hub, wherein the carrier must return the result within a specific time period and the insurance hub monitors the result. Another commitment is from the insurance hub to carrier, wherein at the end of each reporting period, the insurance hub reports the average turnaround time to the carrier.

2. Supply Chain Management

In a large manufacturing enterprise, a manufacturing facility may be separate from a stocking center for reasons of efficiency. The manufacturing facility deals with various channels, which are actual customers of the manufacturing enterprise. The stocking center orders raw materials from suppliers. In accordance with the invention, the interactions among these four entities (manufacturing facility, stocking center, customers and suppliers) are modeled as e-services, wherein business relationships among such entities are modeled as business commitments on top of such e-services. In this example, various commitments can be defined. For example, one commitment may be defined as "customer serviceability", which is a commitment from the manufacturing facility to the channels. Depending on the channel/customer class, the on-time percentage could be set at 95%. Furthermore, delivery can be deemed to be "on-time" if such delivery is finished within a pre-defined delivery time, such as 3 or 4 days.

Another commitment can be defined as "supplier replenishment", which is a commitment from a supplier to the stocking center. Depending on the supplier name, part name or part family name, the stocking center may require that a cycle time should be less than 2 days, standard deviation should be less than 4 hours, and error tolerance should be less than 2 hours.

Another commitment can be defined as "forecast accuracy". Depending on part name or part family name, the "forecast accuracy" should be greater than 80%.

In the above example, the KPIs, condition matching variables, and commitment variables are apparent. For example, in the third commitment, "ForecastAccuracy" is a KPI, Part-Name or PartFamilyName is a ConditionMatchingVariable, and 80% is a value for a CommitmentVariable (e.g., like $FA). During the run-time, the value for $FA can be dynamically modified, thus effectively change the commitment on the fly.

Although illustrative embodiments have been described herein with reference to the accompanying drawings, it is to be understood that the invention is not limited to the precise system and method embodiments described herein, and that various other changes and modifications may be affected therein by one skilled in the art without departing form the scope or spirit of the invention. All such changes and modifications are intended to be included within the scope of the invention as defined by the appended claims.

What is claimed is:

1. A method for monitoring and controlling business level SLAs (service level agreements) via probe points, comprising:

operating at least one host computer to execute a business process commitment language (BPCL) configurator, the BPCL configurator to configure an actuator for implementing management directives;

operating the BPCL configurator to configure a condition evaluator for evaluating logical conditions; and operating the BPCL configurator to configure a key performance indicator (KPI) calculator for calculating a KPI value, wherein the at least one host computer determines the probe points of a business process for controlling SLAs based upon business directives, wherein the at least one host computer determines the probe points of the business process upon determining that at least one probe point is unavailable for detecting a dependency between the KPI and at least one of the business directives, wherein the determined probe points replace the unavailable probe point.

2. The method of claim 1, further comprising operating the BPCL configurator to configure an actuator for providing notification of SLA violations.

3. The method of claim 1, wherein the SLAs are based on business commitments that are globally modeled for a plurality of entities.

4. The method of claim 1, wherein BPCL is described using XML syntax.

5. A computer program product for monitoring and controlling business level SLAs (service level agreements) via probe points, the computer program product comprising:

a computer readable storage medium having computer readable program code embodied therewith, the computer readable program code comprising:

computer readable program code configured to operate a business process commitment language (BPCL) configurator to configure an actuator for implementing management directives;

computer readable program code configured to operate the BPCL configurator to configure a condition evaluator for evaluating logical conditions; and computer readable program code configured to operate the BPCL configurator to configure a key performance indicator (KPI) calculator for calculating a KPI value, and determine a probe point of a business process for controlling SLAs based upon business directives, wherein the probe point is determined upon determining that at least one probe point is unavailable for detecting a dependency between the KPI and at least one of the business directives, wherein the determined probe point replaces the unavailable probe point.

6. The computer program product of claim 5, further comprising operating the BPCL configurator to configure an actuator for providing notification of SLA violations.

7. The computer program product of claim 5, wherein the SLAs are based on business commitments that are globally modeled for a plurality of entities.

8. The computer program product of claim 5, wherein BPCL is described using XML syntax.

* * * * *